United States Patent [19]
Goloff et al.

[11] Patent Number: 5,682,923
[45] Date of Patent: Nov. 4, 1997

[54] ACCUMULATOR HAVING AN INTERNAL ELASTOMERIC MEMBER

[75] Inventors: C. Nicholas Goloff, Secor; Larry K. Rhodes, Pekin, both of Ill.

[73] Assignee: Caterpillar Inc., Peoria, Ill.

[21] Appl. No.: 724,608

[22] Filed: Sep. 30, 1996

[51] Int. Cl.$^6$ ............................................. F16L 55/04
[52] U.S. Cl. ..................... 138/30; 138/26; 220/720; 303/87
[58] Field of Search ............... 138/30, 26, 31; 220/720, 721, 723; 303/87

[56] References Cited

U.S. PATENT DOCUMENTS

| | | | |
|---|---|---|---|
| 1,950,107 | 3/1934 | Guinn et al. | 138/30 |
| 3,378,036 | 4/1968 | Clayton | 138/30 |
| 3,430,660 | 3/1969 | Mitton | 138/30 |
| 3,853,147 | 12/1974 | Cibulka | 138/30 |
| 4,064,911 | 12/1977 | Albrecht | 138/30 |
| 4,181,155 | 1/1980 | Wesselink et al. | 138/30 |
| 4,206,908 | 6/1980 | Mercier | 267/8 |
| 4,243,073 | 1/1981 | Hugley | 138/26 |
| 4,571,009 | 2/1986 | Jones | 138/30 X |
| 4,610,369 | 9/1986 | Mercier | 138/30 X |
| 4,651,781 | 3/1987 | Kandelman | 138/30 |
| 4,823,844 | 4/1989 | Bartholomew | 138/30 |
| 4,826,045 | 5/1989 | Price et al. | 138/30 X |
| 4,852,615 | 8/1989 | Stil | 138/30 |
| 4,897,906 | 2/1990 | Bartholomew | 29/890.9 |
| 5,215,124 | 6/1993 | Hattori et al. | 138/30 |
| 5,368,073 | 11/1994 | Murphy | 138/30 |
| 5,456,787 | 10/1995 | Myles | 156/321 |

*Primary Examiner*—Patrick Brinson
*Attorney, Agent, or Firm*—J. W. Burrows

[57] ABSTRACT

Accumulators normally have a first chamber filled with a pressurized gas, a second chamber in communication with the pressurized fluid of a hydraulic system and an elastomeric member separating the chambers. In the subject invention, an accumulator is provided which has an elastomeric member disposed in a closed chamber of a housing. The elastomeric member has an outer surface with a non-uniform linear surface and a cavity extending inward from one end thereof and in communication with an inlet conduit. As the pressure is introduced into the cavity of the elastomeric member, the non-uniform linear outer surface is progressively forced against an interior surface of the closed chamber. The progressive compression of the elastomeric member acts to increase the volume of the cavity as the pressure of the fluid in the cavity progressively increases.

13 Claims, 1 Drawing Sheet

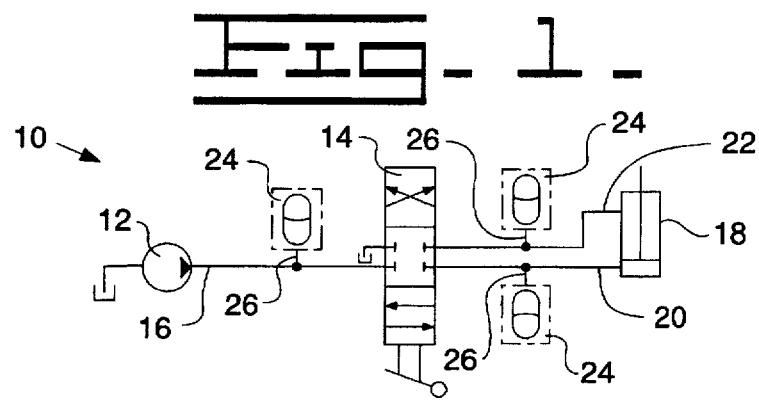
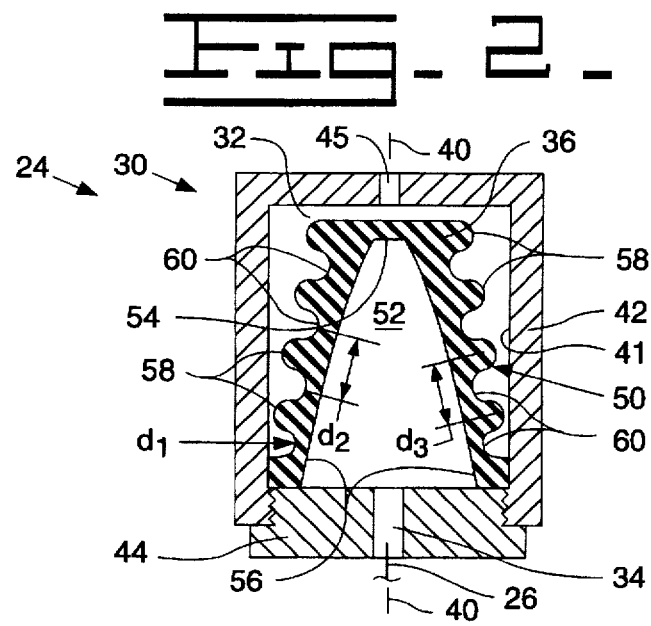
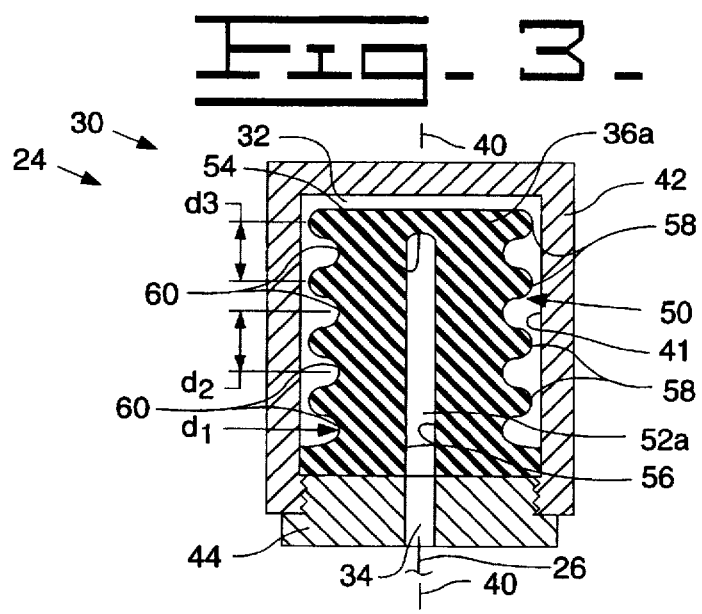

ACCUMULATOR HAVING AN INTERNAL ELASTOMERIC MEMBER

TECHNICAL FIELD

The subject invention relates generally to accumulators used in hydraulic systems and more particularly to accumulators having elastomeric members subjected to the pressures within the hydraulic system.

BACKGROUND ART

Accumulators used in hydraulic systems are well known and are made in various styles and forms. Most know accumulators have two distinct chambers. The first being a pressurized gas filled chamber or bladder and the second being a chamber in communication with the fluid in the system. The two chambers are normally separated by an elastomeric member. These types of accumulators are normally connected to existing conduits in the system and require varying amounts of space depending on the size and capacity of the accumulator. Other types of accumulators have been used in order to conserve space. These types use a special spool type bore having a piston and a spring disposed therein to bias the piston in one direction against the bias of the spring as the system pressure increases. These types are also expensive to incorporate in a hydraulic system since they require special controlled size bores and expensive machining. In the above types of accumulators, it is normally necessary to provide a vent to the atmosphere/reservoir or at least provide a pre-charge gas pressure.

The present invention is directed to overcoming one or more of the problems as set forth above.

DISCLOSURE OF THE INVENTION

In one aspect of the present invention, an accumulator is provided and adapted for use in a fluid system. The accumulator includes a housing defining a closed chamber having a longitudinally axis and an inlet conduit connected to the closed chamber and an elongated elastomeric member having an outer surface extending along the length thereof. The elongated elastomeric member has an internal cavity defined therein extending generally along the longitudinal axis of the closed chamber and being disposed within the closed chamber. The internal cavity is defined by substantially straight sides, a closed bottom surface and an open end in communication with the inlet conduit. The outer surface of the elongated elastomeric member is a non-uniform, linear surface.

BRIEF DESCRIPTION OF THE DRAWING

FIG. 1 is a partial schematic and a partial diagrammatic representation of a hydraulic system incorporating the subject invention;

FIG. 2 is a diagrammatic representation of one embodiment of the present invention; and FIG. 3 is a diagrammatic representation of another embodiment of the present invention.

BEST MODE FOR CARRYING OUT THE INVENTION

Referring to the drawings, and more particularly to FIG. 1, a hydraulic system 10 is illustrated and includes a source of pressurized fluid 12, such as a hydraulic pump, a directional valve 14 connected to the source of pressurized fluid by a conduit 16, a fluid actuator 18 connected to the directional valve 14 by respective conduits 20,22, and respective accumulators 24 of a plurality of accumulators connected to the respective conduits 16,20,22. Each of the accumulators 24 has an inlet conduit 26 that connects the respective accumulator 24 to the appropriate conduits 16,20, 22. Even though a plurality of accumulators 24 are illustrated, it is recognized that in some systems it may not be necessary to have all of the illustrated accumulators 24 and likewise some systems may require more accumulators depending on system needs. Even though the respective accumulators 24 are illustrated as being connected externally to the respective conduits 16,20,22, it is recognized that the respective accumulators 24 could be an integral part of the directional valve 14, the actuator 18, or other system components, such as manifold blocks, without departing from the essence of the subject invention. Additionally, it is recognized that in order to make the accumulators 24 an integral part of the system, it is necessary only to provide a drilled or cored opening with an inlet conduit 26 connecting the drilled or cored opening with the source of pressurized fluid 12.

In the subject hydraulic system, the pressure in any conduit 16,20,22 may be considered as being a source of pressurized fluid 12. Consequently, any of the accumulators 24 may be disposed in any portion of the hydraulic system 10.

Since each accumulator 24 of the plurality of accumulators are the same, only one will be described in detail hereafter. The accumulator 24 illustrated in FIG. 2 includes a housing 30, a closed chamber 32 defined therein, and a passage 34 connecting the closed chamber 32 with the inlet conduit 26, and an elongated elastomer member 36 disposed in the closed chamber 32.

The housing 30 is generally cylindrical in cross-section and defines a longitudinal axis 40. The closed chamber 32 is defined by a generally cylindrical interior surface 41 and the respective ends of the housing 30. The interior surface 41 thereof extends generally parallel to the longitudinal axis 40. The housing 30 is illustrated as a two piece housing having a cap portion 42 and a plug portion 44 threadably connected with the cap portion 42 to define the closed chamber 32. An opening 45 is defined in the cap portion of the housing 30 on the end opposite the passage 34 and lies generally along the longitudinal axis 40. As illustrated, the passage 34 is defined in the plug portion 44. It is recognized that the closed chamber 32 can be formed in various ways without departing from the essence of the invention.

The elongated elastomer member 36 has a non-uniform, linear outer surface 50 and a cavity 52 defined therein extending inwardly from one end thereof and terminating at a bottom surface 54. The cavity 52 is generally conical in shape with a substantially straight side 56. The substantially straight side 56 terminates at the bottom surface 54 to form a cavity 52 that has the general shape of a truncated cone. The one end of the elastomer member 36 is sealingly secured to the plug portion 44 to ensure that the cavity 52 is maintained separated from the portion of the closed chamber 52 that is adjacent the outer surface 50. The elastomeric member 36 generally tapers inwardly from the one end towards the other end in a generally conical shape and is terminated at the other end to form a generally truncated cone shape.

The non-uniform, linear outer surface 50 of the elastomeric member 36 is generally an undulating surface. The undulating surface is formed by providing peaks 58 and valleys 60. The peaks 58 and valleys 60 are formed by interconnecting various radii together. In the subject embodiment, the radii are all the same size. However, it is recognized that the various radii could be of different sizes.

A distance $d_1$ is established between the bottom of the respective valleys 60 and the substantially straight side 56 of the cavity 52. The distance $d_1$ respectively increases from the one end of the elastomeric member 36 towards the other end thereof. A distance $d_2$ is established from a point on one valley 60 to the corresponding point on an adjacent valley 60 and a distance $d_3$ is established from a point on one peak 58 to a corresponding point on an adjacent peak 58. The other end of the elastomeric member 36 is spaced from the opening 45.

Referring to FIG. 3, another embodiment of the present invention is illustrated. Like elements have like element numbers. Modified elements have element numbers followed by a letter. The elongated elastomeric member 36a of FIG. 3 has a cylindrical cavity 52a with a substantially straight side 56 and the outer, undulating surface 50 generally has a cylindrical shape. Each of the peaks 58 of the elastomeric member 36a is generally equally spaced from the interior surface 41 of the housing 30 that forms the closed chamber 32. In the arrangement of FIG. 3, the distance $d_1$ is generally the same along the entire length of the elastomeric member 36a. The portion of the closed chamber 32 of FIG. 3 is filled or partially filled with a fluid, such as, a pressurized gas. The elastomeric member 36a is sealingly secured to the plug portion 44 in order to ensure that the cavity 52a is maintained separated from the portion of the closed chamber 32 adjacent the outer surface 50.

It is recognized that various forms of the subject invention could be utilized without departing from the essence of the subject invention. For example, it is recognized that the opening 45 of FIG. 2 could be provided in the embodiment of FIG. 3 to vent the portion of the closed chamber to the atmosphere and that the opening 45 of FIG. 2 could be eliminated and the portion of the closed chamber 32 adjacent the outer surface 50 filled or partially filled with a fluid, such as a liquid or a pressurized gas. Additionally, the accumulator could be an integral part of the control valve 14, the actuator 18 or some other component of the fluid system 10, such as hydraulic manifold blocks. When the accumulator 24 is an integral part of a component of the fluid system 10, the housing 42 is a part of the system component. The closed chamber 32 is formed by a drilled passage or the like and the elastomeric member 36 is placed in the drilled passage and the plug portion 44 retains the elastomeric member 36 therein. The passage 34 or conduit 26 may also be integral with the system component.

Industrial Applicability

During operation of the hydraulic system 10, pressurized fluid is directed from the source of pressurized fluid 12 through the directional valve 14 to the desired end of the actuator 18. The pressurized fluid in the respective conduits 16,20,22 is directed to the associated ones of the accumulators 24 through the respective conduit 26.

In the event of a failure in the source of pressurized fluid 12, the accumulator 24 connected to the conduit 16 provides a volume of pressurized fluid to the directional valve 14 until the pressure in the conduit 16 decreases to a level below the precharge of the accumulator 24. In systems where the source of pressurized fluid 12 is at a remote distance from the directional valve 14, the accumulator 24 can be positioned close to the directional valve 14. Consequently, when the directional valve 14 is moved to a position directing pressurized fluid to the actuator 18, any sudden rush of fluid to the actuator 18 can be supplemented by the accumulator 24 without permitting a decrease in the pressure of the fluid in the conduit 16 that might otherwise occur due to the frictional losses of the flow of fluid between the source of pressurized fluid 12 and the remotely located directional valve 14.

The accumulators 24 connected to the respective conduits 20,22 act to provide a volume of fluid to the actuator 18 to offset leakage in the actuator 18, to provide a damping or cushion to overcome pressure spikes developed in the respective conduits 20,22 during operation, or to provide a damping function to absorb the high loads attributed to the actuator 18 reaching the end of its travel.

In the subject embodiments, the accumulators are normally small in size and integral with other components of the system 10. Each of the accumulators 24 have a volumetric capacity in the range of 320–1250 cubit millimeters (approximately 0.5–2 cubic inches). It is recognized that the volumetric capacity could be larger than that noted above depending on system requirements and permissible space. The subject accumulators are adaptable to operate in systems with lower pressures and in systems with relatively high pressures, for example in the order of 25,000 to 30,000 kPa (3625 to 4350 psi).

Referring to the embodiment of FIG. 2, since the inlet conduit 26 and the passage 34 are basically the same, the pressurized fluid in the respective conduits 16,20,22 is in communication with the surfaces that form the closed chamber 32. As the pressure in the cavity increases, the forces acting on the substantially straight side 56 and the bottom surface 54 forces the elastomeric member 36 to expand. During the expansion, the peaks 58 closest to the interior surface 41 of the closed chamber 32 presses against the interior surface 41 and begins to deform the elastomeric material. As the pressure in the cavity 52 continues to increase, the elastomeric member 36 continues to expand forcing other peaks 58 to contact and press against the interior surface 41. As the elastomeric member 36 expands, it also stretches thus closing the opening 45. In the event of a rupture of the elastomeric member 36, the opening 45 is sealed thus preventing the escape of hydraulic fluid to the atmosphere. With increasing pressure in the cavity 52, the peaks 58 are gradually flattened and the size of the valleys 60 decrease. As the pressure is increasing and the elastomeric member 36 is being compressed, it becomes increasingly more solid. Consequently, the accumulator 24 is able to receive a quantity of fluid at progressively higher pressures without requiring a lot of space.

As previously noted, the opening 45 could be plugged or eliminated and the portion of the closed chamber 32 adjacent the outer surface 50 of the elastomeric member 36 could be filled or partially filled with a fluid, such as a pressurized gas. This would enhance the ability of the accumulator 24 to operate at higher pressure levels.

Referring to FIG. 3, the system operates in the same manner as that of FIG. 2. As the pressure in the cavity 52a increases, the elastomeric member 36a expands forcing the peaks 58 towards the interior surface 41 of the closed chamber 32. As the pressure continues to increase, the peaks 58 contact the interior surface 41 of the closed chamber 32. With increased pressure, the peaks 58 are flattened and the valleys 60 become smaller. As noted with respect to FIG. 2, as the elastomer member 36a is compressed, it likewise becomes more solid. The fluid or gas in the closed chamber 52a acts to enhance the resistance of the elastomeric member 36a to expansion thus increasing the magnitude of system pressure that the subject accumulator 24 can be subjected. As set forth above, the opening 45 of FIG. 2 could be provided in the embodiment of FIG. 3 to vent the closed chamber 32 to the atmosphere. With the opening 45 provided, as the elastomeric member 36a expands, it also stretches thus closing the opening 45 to trap hydraulic fluid in the event the elastomeric member 36a ruptures.

Various types of elastomeric materials could be used to make the elastomeric members 36,36a without departing from the essence of the invention. For example, the elastomeric material could be made from a highly saturated nitrile material.

In view of the foregoing, an accumulator 24 is provided that can readily be placed in a small space or made integral with other system components and still be adaptable to operate in systems with low pressure or in systems with relatively high pressures.

We claim:

1. An accumulator adapted for use in a fluid system, comprising:

a housing defining a closed chamber with substantially straight sides and having a longitudinally axis and an inlet conduit connected to the closed chamber; and an elongated elastomeric member being disposed within the closed chamber and having an outer surface extending along a length thereof and an internal cavity defined therein extending generally along the longitudinal axis of the closed chamber, the internal cavity being sealingly separated from the closed chamber by a portion of the elastomeric member and is defined by substantially straight sides, a closed bottom surface and an open end in communication with the inlet conduit, and at least a portion of the outer surface is an undulating surface that is spaced a predetermined distance from the substantially straight side of the closed chamber.

2. The accumulator of claim 1 wherein the undulating surface has peaks and valleys and the distance from the top of the respective peaks to the bottom of the respective valleys is substantially the same.

3. The accumulator of claim 2 wherein the distance from a point on one peak to a corresponding point on an adjacent peak is the same for all adjacent peaks.

4. The accumulator of claim 3, wherein the distance from a point on one of the valleys to a corresponding point on an adjacent valley is the same for all adjacent valleys.

5. The accumulator of claim 4 wherein the peaks of the outer surface of the elastomeric member are substantially equally spaced from the substantially straight side of the closed chamber.

6. The accumulator of claim 5 wherein the straight sides of the closed chamber are substantially parallel with the longitudinal axis of the closed chamber.

7. The accumulator of claim 6 wherein the portion of the closed chamber adjacent the outer surface contains fluid.

8. The accumulator of claim 7 wherein the fluid in the portion of the closed chamber adjacent the outer surface is a pressurized gas.

9. The accumulator of claim 4 wherein the distance from the substantially straight side of the internal cavity of the elastomeric member to the respective valleys progressively increases from the open end towards the bottom surface thereof.

10. The accumulator of claim 9 wherein the distance from the respective peak to the substantially straight sides of the closed chamber increases from the end of the inlet conduit toward the other end.

11. The accumulator of claim 10 wherein a passage vents the end of the closed chamber opposite the inlet conduit to the atmosphere.

12. The accumulator of claim 10 wherein the portion of the closed chamber adjacent the outer surface of the elastomeric member contains a fluid.

13. The accumulator of claim 12 wherein the fluid in the portion of the closed chamber adjacent the outer surface is filled with a pressurized gas.

* * * * *

UNITED STATES PATENT AND TRADEMARK OFFICE
CERTIFICATE OF CORRECTION

PATENT NO. : 5,682,923

DATED : November 4, 1997

INVENTOR(S) : C. Nicholas Goloff, Lary K. Rhodes

It is certified that error appears in the above-identified patent and that said Letters Patent is hereby corrected as shown below:

Column 5, line 21, delete "longitudinally" and insert --longitudinal--
Column 6, line 25, delete "peak" and insert --peaks--

Signed and Sealed this

Fourteenth Day of April, 1998

Attest:

BRUCE LEHMAN

Attesting Officer

Commissioner of Patents and Trademarks